United States Patent [19]

Rogers

[11] 4,266,458
[45] May 12, 1981

[54] SLITTING CUTTER FOR PARTIALLY SLITTING SHEET METAL WEB

[76] Inventor: John W. Rogers, 25550 Chagrin Blvd., Cleveland, Ohio 44122

[21] Appl. No.: 45,910

[22] Filed: Jun. 6, 1979

Related U.S. Application Data

[60] Continuation-in-part of Ser. No. 878,208, Feb. 16, 1978, abandoned, which is a continuation-in-part of Ser. No. 819,450, Jul. 27, 1977, abandoned, which is a division of Ser. No. 713,599, Aug. 12, 1976, Pat. No. 4,170,691, which is a continuation-in-part of Ser. No. 648,533, Jan. 12, 1976, abandoned, which is a continuation-in-part of Ser. No. 612,275, Sep. 11, 1975, abandoned.

[51] Int. Cl.³ .............................................. B23D 19/04
[52] U.S. Cl. ........................................ 83/864; 83/332; 83/675
[58] Field of Search ................. 83/881, 332, 675, 676, 83/503, 482, 906, 862–865; 225/96.5

[56] References Cited

U.S. PATENT DOCUMENTS

| 671,915 | 4/1901 | Curtis | 83/332 |
|---|---|---|---|
| 845,764 | 3/1907 | Curtis | 83/332 X |
| T911,003 | 6/1973 | Himelreich, Jr. | 83/675 |
| 2,731,083 | 1/1956 | Broden et al. | 83/881 X |
| 3,329,049 | 7/1967 | Hubbard | 83/332 X |
| 3,863,537 | 2/1975 | Huelsman | 83/503 |
| 4,109,500 | 8/1978 | Franek | 225/96.5 X |

Primary Examiner—Frank T. Yost
Attorney, Agent, or Firm—John F. Carney

[57] ABSTRACT

Apparatus is described for slitting an elongated web of sheet metal to produce a plurality of strips that are retained in the web during coiling by intermittently spaced connections. The connections are formed by partially sheared tabs that are easily broken apart for ultimate separation of the strips. Also described is a slitting cutter configuration particularly adapted to produce partially sheared tabs.

22 Claims, 30 Drawing Figures

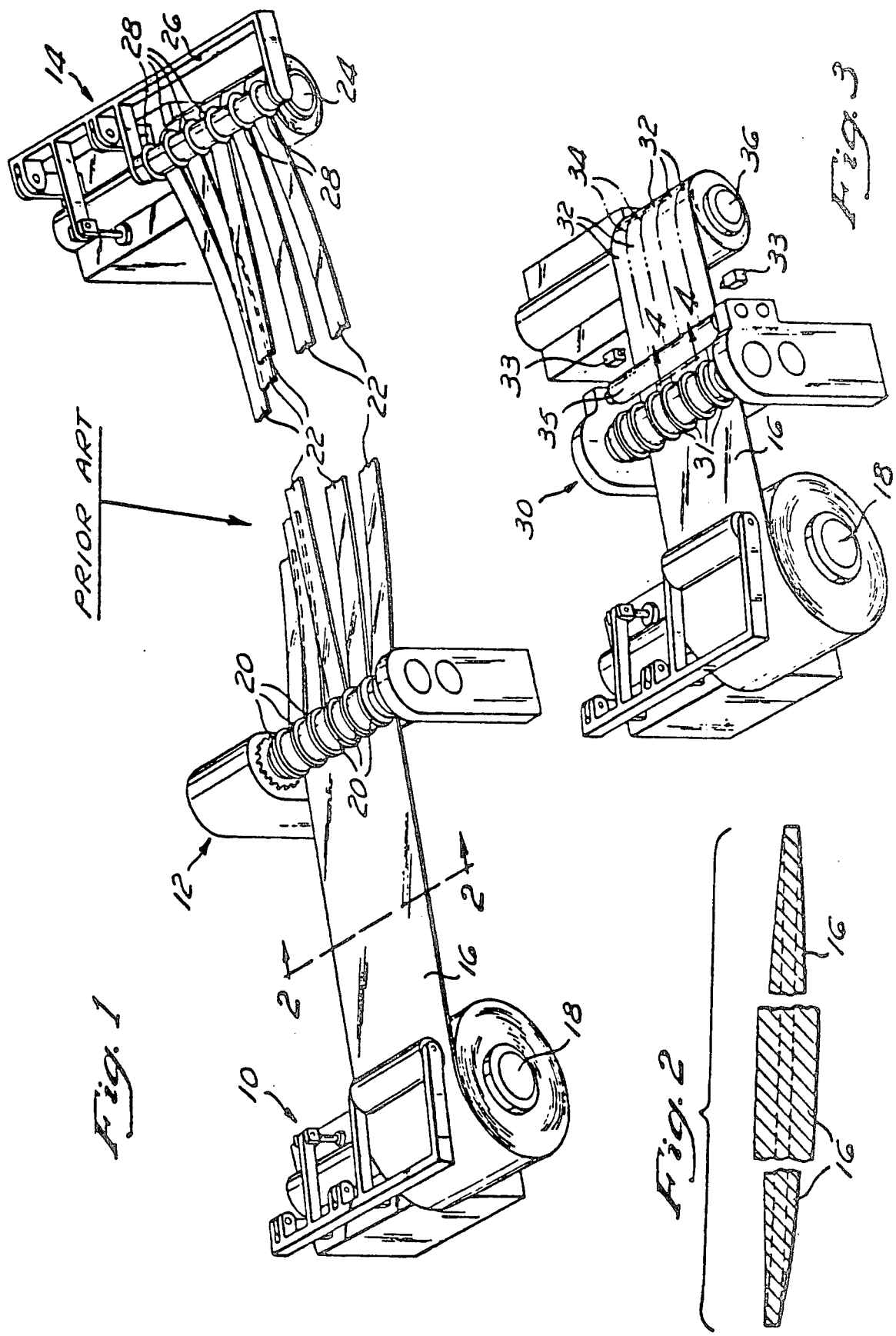

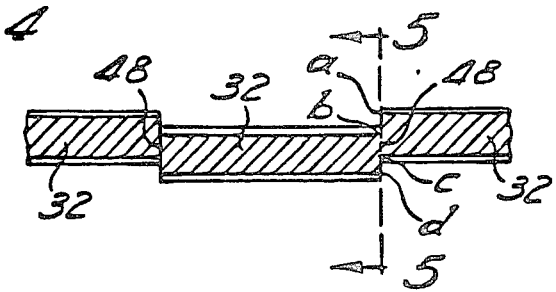
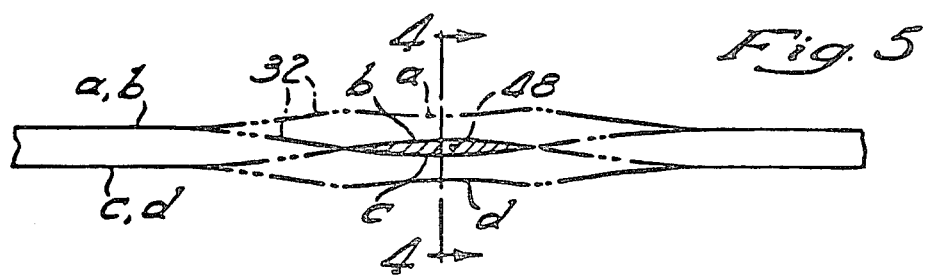
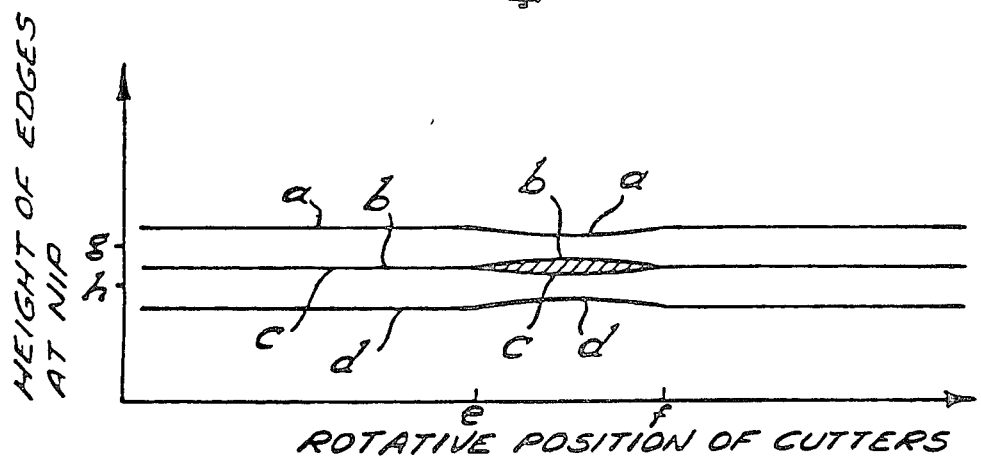
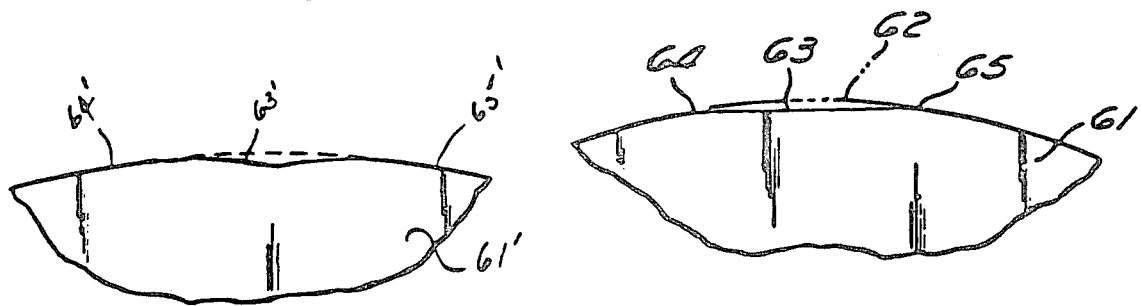

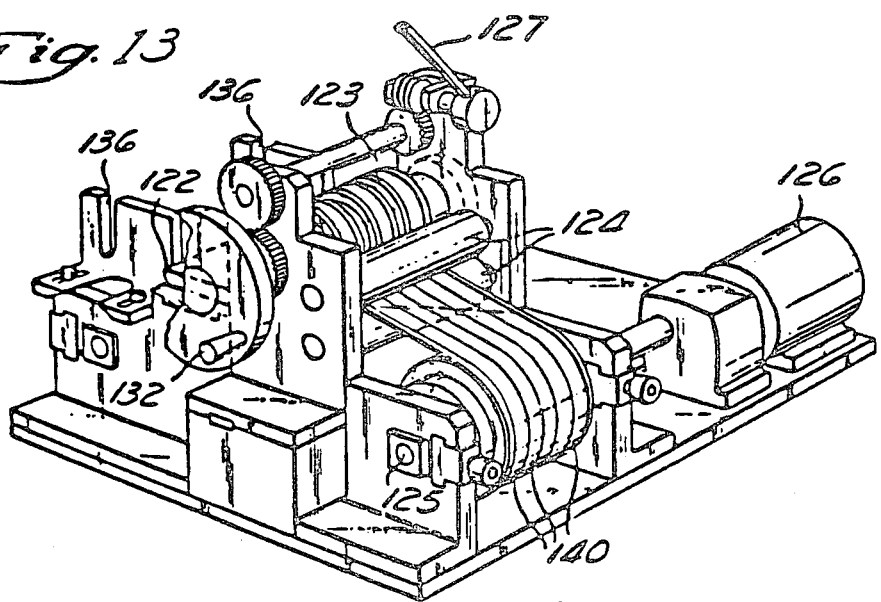
Fig. 13
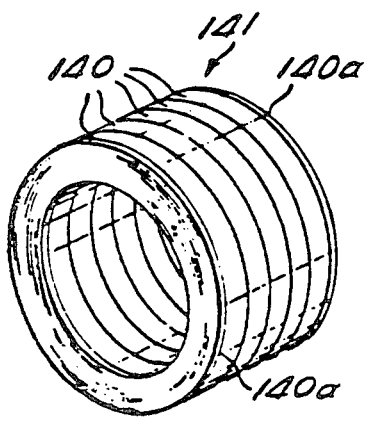
Fig. 14
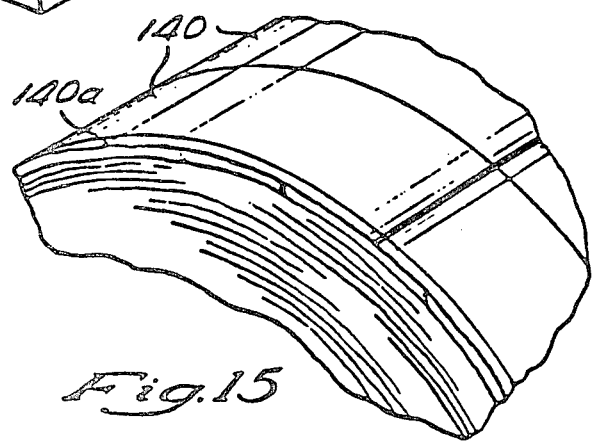
Fig. 15
Fig. 17
Fig. 16
Fig. 17a

SLITTING CUTTER FOR PARTIALLY SLITTING SHEET METAL WEB

PRIOR APPLICATIONS

This application is a continuation-in-part of U.S. patent application Ser. No. 878,208, filed Feb. 16, 1978 as a continuation-in-part of U.S. patent application Ser. No. 819,450, which was filed July 27, 1977 as a division of U.S. patent application Ser. No. 713,599, now U.S. Pat. No. 4,170,691. This latter application was filed Aug. 12, 1976 as a continuation-in-part of U.S. patent application Ser. No. 648,533 of Jan. 12, 1976 which, in turn, was a continuation-in-part of U.S. patent application Ser. No. 612,275 of Sept. 11, 1975. U.S. patent application Ser. Nos. 612,275, 648,533, 819,450 and 878,208 are now abandoned.

BACKGROUND OF THE INVENTION

In the manufacture of flat rolled metal it is most convenient and economical to form the web of a much greater width than is normally required by the end user and then slit the web into narrower strips of a suitable width. The metal web is coiled as it is processed, then, in a separate operation, placed on an uncoiler, unwound, trained through a slitter and then rewound as a number of separate narrower strips on the coiler. The slitting operation may be accomplished at the point of manufacture, by middlemen, such as warehousemen, or by the end user of the sheet metal.

Regardless of at what point the coil slitting takes place, inherent characteristics of the sheet metal and conventional coil slitting processes result in a number of difficulties to which the industry has responded in a manner which, in many cases, only solves the problems encountered by producing other, different problems.

For example, although the sheet of metal being slit is generally thought of as having a rectangular cross-sectional configuration, in fact, conventional sheet metal manufacturing processes produce a sheet which is crowned, i.e., is thicker, at its center than at its edges. Obviously, as such a sheet is rewound on a coiler as a series of separate strips following slitting, those strips slit from the center of the sheet are thicker and as a result are rewound more tightly than those strips slit from adjacent the edges of the sheet. This in turn results in so called "slack strands" being formed by the thinner strips between the slitter and coiler. To overcome the problem of slack strands a number of solutions have been advanced, and in fact are found in use today throughout most coil slitting operations. One approach has been to insert pieces of cardboard or paper between the wraps of those coils positioned outwardly of the center coil to compensate for the differences in thickness of the strips being rewound. This is often performed manually, which is both cumbersome and dangerous, and even where performed mechanically is still cumbersome and requires a specially designed machine. In both cases, the cardboard or paper pieces must be removed later as the strip is decoiled for punching, pressing or other operations.

Two other related approaches to the problem of slack strands are the looping and festooning of the strands intermediate the slitter and the coiler. Looping requires the provision of a deep pit, which is both inconvenient and expensive, while festooning requires the installation of a series of rolls mounted in towers above the process line, an obviously costly expedient, and in both looping and festooning control of the slack stands is always a problem.

While individual coilers could be provided for each of the strips resulting from the coil slitting operation, as a practical matter the expense of such provision will usually be prohibitive. Another approach which is based upon individual treatment of the slit strips but which does not require separate coilers is slip core winding. In this process, the strips are wound on nonmetallic cores that are allowed through friction to wind at a speed commensurate with the thickness of the strips. However, the cores used in this operation are in themselves expensive and must be retained within and shipped with the coils, and in addition they may distort under load and cause irregular winding.

Another problem characteristic of conventional coil slitting operations which is independent of the crowned configuration of the metal sheet and would, therefore, exist even if the sheet were perfectly rectangular in cross section, is interleaving of the strip edges as they are rewound on the coiler. Interleaving in turn results in damage to the edges of coil, loss of production time resulting from the necessity of manually separating interleaved coils and difficulties in feeding such coils, because of their damaged edges, through machinery such as punching presses and the like.

To prevent interleaving during rewinding, an attempt is generally made to keep the individual strips separate from each other. This may be accomplished by positioning spacer plates between coils or through the use of a series of discs which are mounted on a shaft separate from the coiler and allowed to penetrate between the coil edges as they are rewound.

Regardless of the particular manner in which separation is attained, it will be seen that separation requires lateral displacement of the individual strips from each other. This in turn requires that the coiler be spaced a considerable distance from the separator to allow the strips to fan out gradually from the slitter to the required spacing at the coiler. Ordinarily, to obtain a total lateral displacement of approximately two to three inches it is necessary to provide from fifteen to twenty feet of spacing between the slitter and the coiler.

From the above it will be apparent that conventional coil slitting operations possess many inherent disadvantages and present many problems which have traditionally either been accepted or only partially solved, often at the expense of introducing other difficulties and new problems into the process. A need therefore, has long existed for a new approach to coil slitting which obviates the problems of slack strands and coil interleaving and all of their attendant disadvantages.

SUMMARY OF THE INVENTION

In accordance with the present invention apparatus is described for performing coil slitting in a two step operation which permits all of the strips slit from a single sheet to be rewound as a unit and thereby obviates the traditional coil slitting problems of slack strands and coil interleaving.

Although cutting web material in more than one cutting step is not unknown (see for example, U.S. Pat. No. 876,008), including cutting of metal strips in more than one step (U.S. Pat. Nos. 3,628,710 and 3,641,853), in such prior art cutting processes completion of cutting is accomplished before rewinding of the sheet being cut has commenced. As a result, the same problems of slack strands and interleaving that occur in conventional, one step cutting processes would occur in a two step process where the final cutting step is accomplished before rewinding has commenced, to the same extent that they would have occurred had the cutting been accomplished in only one step.

In contrast, in accordance with the present invention, as the unslit sheet is unwound from the uncoiler and trained through the slitter, the sheet is only partially slit or cut, or is fully slit and immediately lightly reconnected to provide the equivalent of partial slits or cuts, resulting in a set of interconnected strips which are delivered to the coiler as a single sheet. Thereafter, after rewinding has commenced, that is, at any time between the time when the interconnected strips have begun to wrap the coiler reel and such time as the coils are unwound for use, the partial cuts or equivalents made at the slitter may be completed to provide the separate, narrower coils desired. Since, until the partial cuts or equivalents made at the slitter are completed, the interconnected strips behave as a single sheet, they can be treated as such during coiling without fear of slack strands, strip interleaving and all of their attendant problems and difficulties.

In accordance with one aspect of the invention, complete separation of the coils is not made until the coils are ultimately unwound by the end user as, for example, they are fed into a press. In accordance with this aspect, an additional advantage is gained over and above those discussed above in that individual banding and handling of separate coils following the slitting operation are eliminated. Or the coils may be individually broken off as units, preferably by the end user, rather than being individually unwound in which case individual handling may both (1) be more efficient than in conventional practice and (2) require little change from conventional practice in utilizing ordinary handling equipment such as cranes or lift trucks to transport and position individual slit coils.

In accordance with another aspect of the invention, completion of the partial cut is made during the first wrap of the coils on the coiler mandrel. In this embodiment of the invention, final separation is made preferably as close as possible to the beginning of the second wrap, allowing the first wrap of interconnected sheets to thereby act as a wrapper for the separated coils.

Regardless of whether final separation is accomplished on the coiler or at some later stage, the final parting arrangement can be relatively simple.

The present invention recognizes that in a conventional operation for slitting sheet metal web material pairs of opposed rotary cutters are operably positioned with respect to the web to produce the desired lines of cut. Cutting or severance of the material is achieved by a combined shearing and breaking action. The web material is initially sheared by the penetration of the edges of the cutters into the surface of the material which results in momentary relative displacement of the material on opposite sides of the line of cut in a direction substantially perpendicular to the plane of the sheet. However, as this shearing action progresses through the thickness of the material a point is reached at which, due to the relative displacement of material on either side of the line of cut, the remaining material not yet sheared is caused to fracture thereby resulting in the complete severance of material along the respective lines of cut.

According to the present invention slitting of sheet metal web material along respective lines of cut is accomplished in the conventional manner. However, at intermittently spaced locations therealong shearing of the web is terminated short of the point at which fracture occurs such that at these locations a residuum of partially sheared material remains thereby forming a tab or interconnection between the edges of material on opposite sides of the parting line. These so-formed interconnections have sufficient strength to maintain the edges together until the interconnections are broken as part of a subsequent operation.

In the practice of the present invention, the same momentary displacement described above may occur at longitudinal locations where severance of the material is complete, but the resulting strips, at their points of interconnection may also experience a degree of relative displacement of adjacent edges, which displacement may be maintained until the adjacent strips are ultimately separated, unless the strips are knocked back down into a common plane while maintaining the connection between slits, as is presently preferred. Sciving tools can then be used to separate the strips. Or, the adjacent edges of the strips may recover from their momentary displacement at all locations in the practice of certain forms of the invention, particularly where the sheet is fully slit and then immediately lightly reconnected.

If the connection after partial cutting or equivalent is sufficiently delicate, a contoured bending bar or knockdown bar can be utilized bearing on the faces of the interconnected strips, if desired with an endless belt or belts interposed between the bar and the faces of the strips to eliminate scratching and other damage to the strips, to break the remaining bonds between adjacent strips by pressing their edges back towards a common plane or by pressing them momentarily out of a common plane. Or sciving tools can be used to separate the strips either upon coiling after slitting or upon final uncoiling. Or, the daughter coils formed by the partial slitting or equivalent can be broken away from the parent coil, either simultaneously or one at a time.

Of course, other separating tools can also be utilized, including, but not limited to, sharpened rotary cutters slitting the residuums of partially sheared material that forms the connections between adjacent strips as the strips are coiled following partial slitting or at any time following commencement of coiling but before end use.

It will also be seen that under certain circumstances an additional piece of equipment for completing the cut may be unnecessary. Thus, where the partial cutting operation results in a series of interconnected strips having the still-connected portions of their edges displaced from each other in a direction approximately perpendicular the plane of the strips, by controlling rewind tension the remaining bonds between the sheets may be fractured as they are wrapped tightly on the coiler reel. Or, the partial cutting or equivalent may result in a connection which will maintain itself until the connected strips are bent around the winding axis, as upon winding of the connected strips, at which point fracture may occur due to the bending incident to winding. Or, the connection may satisfactorily yield only to differential unbending around the winding axis, as upon unwinding of one of the connected strips while the other remains wound. Or, the connection may or may not resist such differential unbending to an objectionable degree, but may nevertheless satisfactorily yield to imposition of spreading forces between the strips because of the "stiff plane" effect of the connected strips in resisting such spreading forces. Or, a combination of such bending or unbending together with such spreading may be employed, as upon unwinding by pulling the unwinding reach in an unwind path that has a vector component that is parallel to the axis of the coil, or by simply tilting the roll axis away from the horizontal and toward or to a vertical position to thereby allow gravity to assert such a pull. Or, the daughter coils may be broken away from the parent coil, either simultaneously or one at a time, without the use of special tools but simply by impact or pressure, as upon being dropped on or forced against a flat or stepped surface, or upon being struck head-on or glancingly by an industrial truck fork or by a crane hook or the like, or simply by sheer weight when support by a mandrel or the like is removed from a daughter coil in some cases where heavy coils have relatively infrequent and/or highly weakened tacking.

The configurations of the cuts made during the partial slitting operation or equivalent are susceptible to variations within the scope of the present invention. For example, the rotary slitting cutters can be provided with small, profiled flat ground into the peripheral edge of the cutter, thereby providing tacks or connections across the slits made by the cutter. Special shapes other than flats such as gullwing notches formed in the cutters can be used to accomplish the tacking, as described below.

In a variation, the cutters may be arranged to run eccentrically very slightly and adjusted vertically so that alternate complete slitting and incomplete slitting is accomplished. The incomplete slits between completely slit sections would then be separated in any of the different separating processes described above.

In another variation, the arbor of the upper cutter could be mounted for a slight amount of vertical movement, ordinarily on the order of a few thousandths of an inch, and cam or otherwise controlled to provide a periodic lifting of the arbor and cutters mounted thereon to tack across the slitting each time the arbor is lifted.

In another variation, flats or other relief forms on both the upper and lower cutters can be brought into and out of rotative register with each other to alternately accomplish full slitting or tacking.

In still another variation, the cutters can be adjusted vertically so that the sheet is sheared just short of the point of fracture in a continuous, uninterrupted fashion, or as called for when sensors indicate incipient or actual nonuniformity of wrap during full slitting. This alternative is applicable, for instance, when completion of separation is made during the first wrap of the coils on the coiler mandrel. Separation of the strips at the coiler can take place in any of the methods described above.

As indicated above, instead of partially slitting, the cutters may be arranged to continuously completely slit followed however by immediate partial reconnection at a rolling station just beyond the slitting cutters so as to thus, equivalently to partial slitting, maintain the edges of adjacent pre-slit strips connected together during winding.

In the present invention, the slitter and coiler of the slitting line can be related in a new way in which relatively close coupling between slitter and coiler exploits and, so to speak, "captures" the momentary condition of tracking in parallel which is imposed on the edges of the daughter-coils-to-be by the action of the slitting rolls. Close coupling is therefore a positive characteristic of the preferred operation of the invention.

As noted above, one major advantage of the partial slitting, or equivalent, of the present invention is the elimination of the problem of interleaving. As also noted above, the conventional approach to this problem is the use of separators between the slit strips, which in turn necessitates the positioning of the slitter from the coiler at a considerable distance to allow the slit strips to fan out to the lateral displacement necessary to attain separation. Since lateral displacement is no longer necessary when slitting in accordance with the present invention, the requirement that the slitter be spaced a considerable distance from the coiler is eliminated with a consequently much more compact process line and a resultant substantial saving in floor space. The requirement of considerable spacing is not only eliminated but significant operating improvements are achieved by the converse of considerable spacing—a close-coupled relationship between slitter and coiler. Slitting directly from a rolling mill becomes feasible, such as at the last stand of a five-stand tandem cold mill or at a temper mill.

Where final separation is performed by the end user, the elimination of individual banding and handling of separate coils is a major advantage of the invention. Instead, the original parent coil may be formed into a coil construct comprising an array of daughter coils which can be handled together until readily separated by the end user or the warehouser or other middleman. A particular advantage is the improved handling of scrap and improved protection of coils in trans-shipment. Edge trim can be wound as disc-like coils at each end of the array of regular daughter coils, rather than having to be balled, chopped or wound in the conventional manner. These disc-like coils then serve to protect the edges of the endmost regular daughter coils during shipment, and can be readily broken away at the site of coil use and, in some applications, even handled as a unit until remelted or reclaimed.

Final separation of this construct can be accomplished by individually unwinding one after another of the daughter coils which can be supported together on a single mandrel or unwinding stand to be successively (or even simultaneously) presented and fed to a working line or lines. Or, the daughter coils may be broken off as units prior to unwinding. This can optionally be done with breakaway grabs carried by cranes or lift trucks or by their own carriages or the like, so that the daughter coils can be handled by the end user in an efficient manner but in such a way as to be compatible with past procedure in handling individual coils.

Even with the complete elimination of edge interleaving, edge overhang can occur—a condition where a turn of a daughter coil being uncoiled is overhung by a radially outward turn of an adjacent daughter coil so that interference between the edges results. A feature of the present invention eliminates this condition by "step-tracking" the daughter coils on themselves, as more fully explained below. According to another feature, edge overhang is eliminated by dishing the daughter coils. However, in the presently preferred approach in experimental trials, neither "step-tracking" as such, nor dishing is utilized, but natural tracking upon winding is nevertheless sufficient to entirely avoid edge overhang and provide good coil alignment with breakable interconnections between daughter coils disposed for clean shearing action as upon lateral loading of adjacent daughter coils in opposed directions.

From the above and from the following detailed description it will be seen that the present invention provides an entirely new approach to coil slitting operations and eliminates many difficulties, disadvantages and problems associated with conventional processes by not attempting to combat these problems, but by simply obviating their source. Further advantages of the invention will appear from the following description.

BRIEF DESCRIPTION OF THE DRAWINGS

FIG. 1 is a perspective view of a prior art slitting line;

FIG. 2 is a cross-sectional view on line 2—2 of FIG. 1;

FIG. 3 is a perspective view showing a slitting line in accordance with the present invention;

FIG. 4 is an enlarged cross-sectional view taken on the plane of line 4—4 of FIGS. 3 and 5;

FIG. 5 is a cross-sectional view taken on the plane of line 5—5 of FIG. 4;

FIG. 6 is a diagram of the momentary positions at the slitting nip of the edges seen in FIGS. 4 and 5 at different rotative positions of the slitting rolls;

FIG. 7 is a fragmentary view of the edge of a relieved cutter which the invention may employ;

FIG. 7a shows the edge of another relieved cutter which the invention may employ;

FIG. 7b, shows a somewhat modified form of the cutter of FIG. 7a;

FIG. 13 is a perspective view of a working model of the invention;

FIG. 14 is a prespective view of a coil construct contemplated by the invention;

FIG. 15 is a fragmentary detail of FIG. 14;

FIGS. 16 and 17 are schematic cross-sectional views taken across the straight reach of slit strip seen in FIGS. 13 and 18 at different points prior to the wrapping thereof to form the coil construct;

FIG. 17a is a schematic cross-sectional view taken across the straight reach of slit strip seen in FIG. 18 prior to the wrapping thereof, but when the machine is set up somewhat differently than when it produces strip having the cross sections schematically illustrated in FIGS. 16 and 17;

DESCRIPTION OF THE ILLUSTRATED EMBODIMENTS

Figure 8:
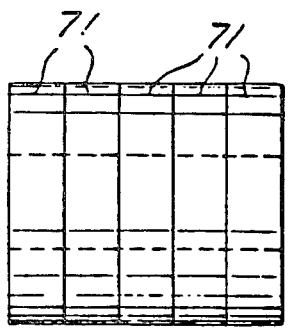
FIG. 8 is a side elevation of an array of daughter coils.

For purposes of background, FIG. 1 of the drawings discloses, somewhat schematically, a more or less conventional slitting line including an uncoiling station 10, a slitting station 12, and a coiling station 14. In accordance with accepted practice, a coil of sheet metal web material or the like 16 is placed upon an unwind mandrel 18 and trained through the slitting station 12.

At the slitting station pairs of cutters consisting of upper rotary cutters, as at 20, that cooperate respectively with like cutters, not shown, disposed beneath the strip and offset with respect to the cutters 20 to slit the incoming sheet metal web into a series of narrower strips 22. The strips 22 are then rewound on a rewind mandrel 24 and a separating device 26 including separating discs 28 serves to prevent interleaving or overhang of the edges of the rewound strips 22.

It will be noted from FIG. 1, that in order to provide the necessary separation at the coiling station 14, the slitting and coiling stations must be positioned a substantial distance from each other.

Additionally and with reference to FIG. 2 of the drawings, it will be noted that the cross-sectional configuration of the sheet 16 varies considerably from an ideal rectangular configuration, shown in dashed lines in FIG. 2, with the center of the sheet actually much thicker than the edges thereof. This characteristic of rolled sheet metal is known as "crown". As a result of "crown", strips cut from the center of the sheet are thicker than those cut from areas displaced outwardly from the center and the center strips are, therefore wrapped more tightly than the outside strips.

This results, as seen in FIG. 1 of the drawings, in the outer strips sagging between the slitter and the coiler. Although only a relatively small amount of sag is shown in the drawings, it will be apparent that as the slitting and coiling process proceeds, the resulting sag will be substantial, requiring pits formed between the slitter and coiler or a system of rollers for festooning the outer strips above the slitting line.

All of the above problems are obviated with the present invention by maintaining limited connections between the slit strips at the slitting station and completing their separation after the sheet has commenced coiling on the rewind mandrel or thereafter. Thus, as seen in FIG. 3 of the drawings, as web 16 is unwound from the mandrel 18 and trained through a slitting station 30, it is predivided into strips 32 while maintaining limited connection, as indicated by the dash-dot lines 34. Therefore, as the interconnected strips 32 are rewound upon the mandrel 36 they, in effect, behave as a single sheet.

As a result, there is no necessity of maintaining separation between the edges of adjacent strips, nor do the thinner strips sag between the slitter and the coiler. As will be particularly apparent from FIG. 3 of the drawings, because the necessity for lateral displacement of the strips at the coiler is eliminated the coiler may be positioned more closely adjacent the slitter, thereby providing a much more compact slitting line and rendering possible the use of a single piece of equipment for both partial slitting and final separation.

Compactness of the slitting line is however only one benefit of the relative adjacency between slitter and coiler. More significant is the achievement of constraints on the strips during coiling to cause them to wind with almost perfect tracking into daughter coils separated by flat side faces. It has been discovered that momentary constraints imposed by the slitting cutters on the side edges of the slit strips can be "extended", so to speak, by causing the slit strips to behave as a single sheet (by tying the edges of adjacent strips together, during or immediately following slitting, as herein described), and that such constraints can be "captured", so to speak, to be made part of the coiling operation by taking up the slit strips on a coiler before such constraints have dissipated with continuing travel of the strips away from the slitting cutters. The result is daughter coils separated by flat interfaces through which extend the breakable ties disposed for clean breakaway shearing action. The constraints can accomplish such flat interfaces despite the almost inevitable occurrence of camber in the sheet material being slit and despite the resultant camber in the slit strips, and even despite a slight degree of yaw in the feed roll supplying the sheet material to the slitter.

The close coupling between the slitter and the coiler contemplated by important aspects of the invention can be eliminated, but only at a cost in reduction of tracking accuracy that will often be unacceptable or at least pointless.

Partial pre-slitting, or the equivalent, can be accomplished periodically or non-periodically, and intermittently or non-intermittently. An example of periodic non-intermittent pre-slitting is the use of flats or other relief on slitting cutters to periodically produce tacks, or interconnections, upon every revolution of the cutters without skipping tacks during some revolution. An example of periodic intermittent pre-slitting is a similar arrangement in which the slitting cutters are positioned so that the interconnections will not occur, but in which such slitting cutters are intermittently shifted to cause the interconnections to occur periodically. An example of non-periodic non-intermittent pre-slitting is the provision of slitting cutters which continually completely slit followed by immediate partial reconnection by the continuous or non-periodic action of rollers positioned just beyond the slitting cutters, without any interruption of such action of the rollers that accomplish reconnecting. An example of non-periodic intermittent pre-slitting is a similar arrangment in which the rollers that accomplish reconnecting are positioned so that such reconnecting does not occur, but in which such rollers are intermittently shifted to cause such reconnection to occur.

As noted above, pre-division can be accomplished in accordance with the present invention in a number of different ways. For example, the strip can be provided with alternating fully separated and less than fully separated sections. Separated sections of say, a few feet in length, or a few inches in the case of thinner material, are joined by less than fully separated sections of relatively short length. Alternatively, the strip can be continuously separated and then rejoined, as mentioned above. In some applications it may be possible that the opposed cutters 31 (FIG. 3) can be provided without flats or reliefs and adjusted to provide a continuous shear line between adjacent strips 32 with the strip sheared to a point just short of complete fracturing and the fracture completed after rewinding has commenced.

The alternative separated and unseparated areas may be produced in a number of ways, including mounting one or both of the cutters somewhat eccentrically, providing one or both of the cutters with flats or other relief shapes on their peripheries or on the faces near their cutting edges, providing a cam action or the like adjustment of one or both of the cutters relative to each other in directions perpendicular to the face of the sheet 16. The reliefs on each cutter may be each insufficient to prevent full separation alone, but capable of doing so if in registration with the relief on the associated cutter, and the reliefs may be brought into and out of register by advancing or retarding the angular position of one cutter relative to the other, by means of a differential drive or the like, as they both continue to rotate through the cutter nip. Combinations of these arrangements may be provided.

All of the above arrangements for providing partial pre-slitting, or the equivalent thereof, can be referred to as "tacking" arrangements. The slit strips are caused to continue to move together by being tacked together, periodically or non-periodically, and intermittently or non-intermittently.

Both periodic and non-periodic or continuous tacking involve maintaining connection between the slit strip edges sufficient to cause the slit strips to wind together. Such maintaining of connection may itself be non-intermittent or it may be made intermittent by interruptions either on a preprogrammed or on a demand basis.

As an example of a demand control, as seen in FIG. 3, sensor means 33 may be provided between the slitting station 30 and winding mandrel 36 for sensing sagging or tension differences or other differences or incipient differences in winding of the slit strips. The sensor may be any appropriate device such as a tension sensor or, as shown, a photoelectric sensor.

Cutters 31 and its companion are positioned close enough for continuous slitting until such time as the sensor 33 detects differences or incipient differences in the winding of the strips 32 whereupon the cutters are moved apart or otherwise adjusted by automatic means (not shown) sufficiently to commence maintaining periodic tacking between the edges of the strips 32 sufficient to cause them to wind together. This condition may be terminated after a given time, in terms of distance or time units, or may be terminated after winding differences or incipient differences are no longer detected.

FIGS. 4 and 5 illustrate the configuration that may result in the region of a "tack" or periodic partially separated area. The adjacent strips 32, due to the shearing action of the cooperating cutters, are displaced vertically with respect to each other when they engage the cutters, and spring back together when they are fully separated by the fracture of the residual portion of material when the shearing action progresses to a sufficient extent through the web thickness. However in an area of partial separation the shearing action produced by the cooperating cutters is terminated short of the extent necessary to effect fracture of the residual portion of web material and the adjacent strips continue to be joined by a bridge 48 of the parent metal connecting the metal of the adjacent coils and maintaining the vertical displacement of the adjacent strips 32 with respect to each other, as seen in FIG. 5, thereby maintaining an increased overall thickness of the adjacent strips considered together as a unit and thereby an increased overall thickness at the locations of the bridges in the turns of the array of daughter coils formed upon coiling.

FIG. 6 diagrams the momentary positions at the cutter nip of the edges a, b, c, d seen in FIG. 4 plotted against different rotative positions of the cutters. The rotative positions of the cutters corresponding to passage through the nip of the flats on the cutters are between positions e and f. The vertical locations g and h on the diagram represent the height of the top and bottom surfaces of the metal sheet prior to close approach to the cutter, and of the fully slit portions following passage through the cutter.

Even if only one cutter is relieved, the cutting action will be similar to that illustrated in FIG. 6. Although the corresponding curves would not be exactly symmetrical about a horizontal axis, they would be roughly similar to the illustrated curves because the adjacent not-yet-parted strips 32 tend to center themselves vertically between cutters even if only one cutter is relieved.

FIG. 7 illustrates one form of relief of a single cutter 61 designed to be paired for operation with a corresponding unrelieved cutter (not shown). The slitting edge of the cutter 61 defined by its circular periphery 62 is relieved by a chordal flat 63 which is faired into the periphery of the cutter at end 64 and 65. In the utilization of paired rotary cutters as described the edges of the cooperating cutters are disposed with respect to the sheet metal web such that the slitting edge of the cutter 61 and the edge of the cooperating cutter will penetrate the opposite surface of the web and impose a shearing action thereon which progresses into the web thickness until a point is reached at which the remaining unsheared material fractures to sever the web along the line of cut. The radial depth of the chordal flat 63 is of such dimension, however, that the penetration of the so-relieved edge into the web thickness will be to an extent short of that required to achieve fracture of the material. The resulting structure of the so-slit web is one which, along the line of cut, there are extended lengths of completely severed material but at periodically spaced locations represented by the loci of penetration of the relieved part 63 of the cutter 61 the edges of material on opposite sides of the line of cut are interconnected by residuums of partially sheared material as shown at 48 in FIGS. 4 and 5.

Figure 9:
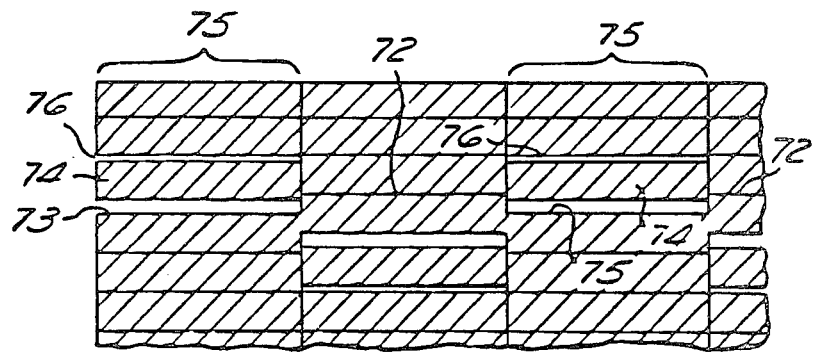
FIG. 9 is a schematic fragmentary cross-sectional view, ignoring sheet crowning, of the upper left edge of the coil array seen in FIG. 8, taken on the plane of the paper.

When the so-slit web material is coiled after passing through the cutters, a plurality of daughter coils 71 are formed, as seen in FIG. 8. The transverse profiles of the turns of the array comprise raised portions 72 and notched portions 73, as seen in FIG. 9.

The notched portions such as 73 may be slightly downwardly penetrated by a succeeding wrap of the corresponding daughter coil. Thus in FIG. 9 each notch 73 is slightly penetrated by the first succeeding wrap 74 of its corresponding daughter coil 75. Similarly the second succeeding wrap may penetrate the slight gap 76 left by wrap 74, and so forth in respect of still later wraps, but the occurrence of such penetration beyond the first succeeding wrap is not illustrated. Corresponding upward penetration may also occur with respect to the reliefs under the raised portions 72, as shown, although any such upward penetration will tend to be minimized by the effect of winding tension.

Figure 10:
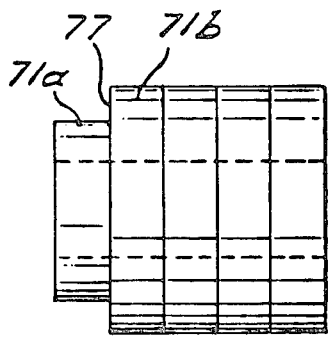
FIG. 10 is a view similar to FIG. 8 with one of the daughter coils partially removed.

The edges of the daughter coils are thereby kept in alignment to prevent edge overhang in circumstances where edge overhang might otherwise occur due to the particular circumstances of coiling. Thus as a daughter coil 71a is uncoiled as in FIG. 10, there is no interference with the face 77 comprising the edges of the turns of the adjacent daughter coil 71b.

Figure 11:
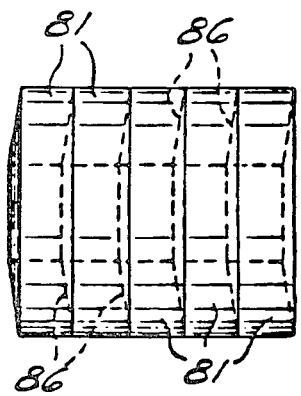
FIG. 11 is a side elevation of another array of daughter coils.
Figure 12:
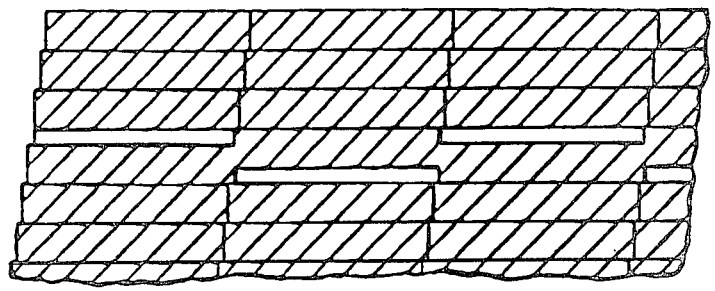
FIG. 12 is a schematic fragmentary cross-sectional view, ignoring sheet crowning, of the upper left edge of the coil array seen in FIG. 10, taken on the plane of the paper.

The array of daughter coils may be formed in a dished configuration as seen in FIG. 11. This may be done by shifting the coiler axially in one direction throughout the coiling operation. Each of the daughter coils 81 and each of the interfaces 86 between daughter coils is dished. The edges of adjacent daughter coils are thereby stepped in a uniform direction, as seen in FIG. 12, whereby edge overhang is avoided and no edge interference occurs when the daughter coils are individually uncoiled.

The arrays of daughter coils are removed from the rewind mandrel and shipped to the end user or the warehouseman or other middleman still interconnected. Final separation takes place as the strips are needed, using any of the final separating processes mentioned herein.

Figure 18:
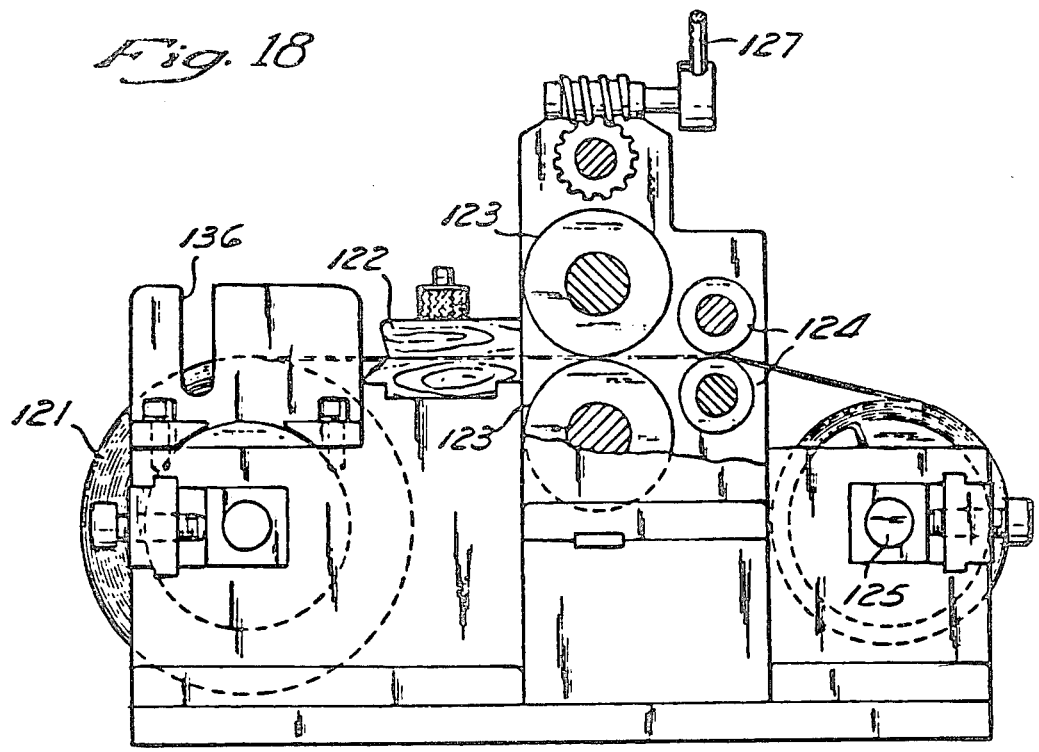
FIG. 18 is a side elevation, partly broken away, of the working model of the invention.
Figure 19:
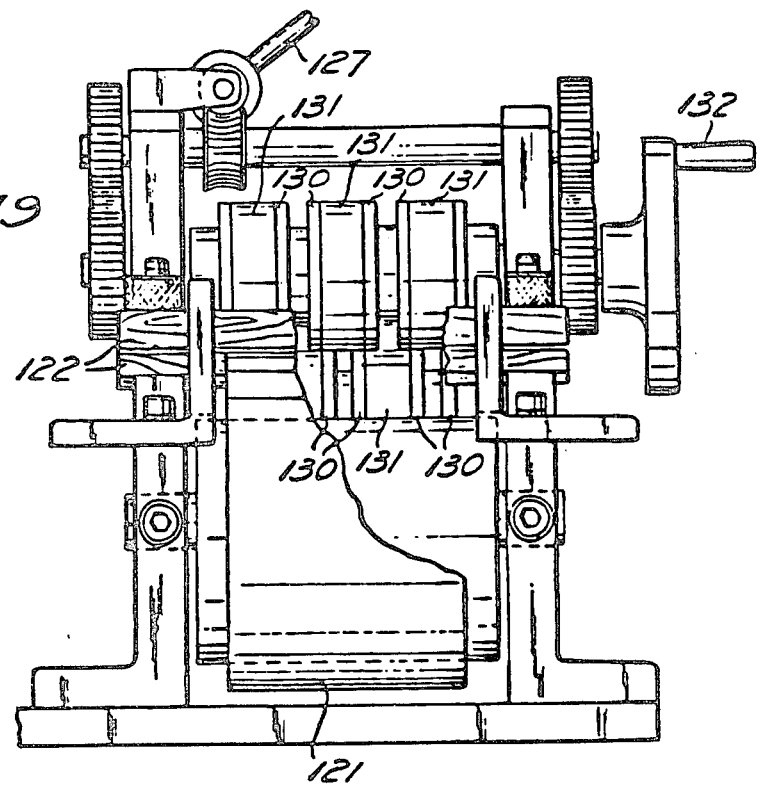
FIG. 19 is an end elevation thereof, partly broken away.

One form of apparatus adapted for slitting sheet metal web material in the manner described is illustrated in FIGS. 13, 18 and 19 where a sheet steel coil 121 (FIG. 18) of about 0.015 inches web thickness is unwound through guide 122 and passed between rotary slitting cutters 123 of about three inches diameter. The cutters 123 are similar to the cutter 61 shown in FIG. 7. From the cutters 123 the web material is passed to a winding mandrel 125 driven by a motor 126 through a suitable reducer and coupling.

According to one aspect of the invention knockdown rolls 124 may be positioned downstream of the cutters 123 although their use is not necessary in every application of the invention. A control handle 127 operates through the illustrated gear train to change the rotative position of an eccentric mounting for the upper cutter 123, thereby adjusting the spacing between the cutters. Each wheel of the lower cutter 123 is provided with a chordal flat as illustrated at 63 in FIG. 7, the flat being 0.125 inch from edge to edge and of a maximum "depth" (maximum chord-to-arc spacing) of 0.006 inches from the cutter circumference.

The cutters 123 each may include the spaced discs or cutters proper 130, coacting pairs of which on the upper and lower cutter rolls act to shear the metal, and the strippers or elastomeric sleeves 131 arranged to push the sheared metal away from the shearing edges as the metal leaves the nip. A crank 132 is provided for manually driving the upper cutter 123 during setup.

With the dimensions given, the tacking established by the chordal flats 63 remains sufficiently connected even after passing through the knockdown rolls (when they are employed) to cause the slit strips to wind together into a plurality of daughter coils 140 (FIG. 14) constituting a parent coil 141. In the illustrated example the two endmost daughter coils 140a constitute edge trim strip and are therefore considerably narrower than the other daughter coils. I have used pretrimmed unwind rolls in experiments, giving them narrow edge cuts to simulate edge trimming.

When the handle 127 is shifted to lower the upper cutters 123, tacking ceases and the slitting is continuous. The slit strips continue to track nicely as the wind into the daughter coils being formed. As soon as a slight fluttering or looseness of one or both of the outermost or next-to-outermost daughter coils is detected, the handle is reshifted to raise the upper cutter and reestablish tacking. The fluttering or looseness immediately disappears as the slit strips are constrained by the tacking to wind together.

The apparatus illustrated in FIG. 18 includes knockdown rolls 124 positioned downstream in the workflow sense from the cutters 123. These rolls traverse the web and are spaced apart a distance approximately equal to or slightly less than, the web thickness. Utilization of these rolls is desirable when the thickness of the web material being slit is greater than 0.015 inches, their function being to return the steps produced in the formation of tacks as shown in FIG. 4 to the plane of the web without fracturing the tacks. Such knockdown rolls are not necessary to the practice of the invention when the web material being worked is less than or not substantially greater than 0.015 inches.

FIGS. 16 and 17 are schematic cross sections of the slit strips immediately downstream of the knockdown rolls. FIG. 16 shows a region of tacking, the bridges between the adjacent strips being shown as more or less sheared but not completely parted. FIG. 17 shows a fully slit region.

Because of the "crown" seen in FIGS. 16 and 17, the edgeward daughter coils forming the parent coil 141 are wrapped more loosely than the more central daughter coils. However because the daughter coils are constrained to wrap together they all have the same number of turns per unit length. The "tacks" are such that the connections between adjacent daughter coils are contained entirely between the front and back faces or surfaces of the sheet metal. The front or back faces are not uninterrupted across the "tacks", as would be the case if slitting were entirely discontinued at the connecting regions. The opposite edge faces of adjacent daughter coils created by the slitting operation each have a continuous corner edge throughout the length of the daughter coils, including the "tacked" portions thereof.

The "tacks" or connections between the slit strips may be established in such a manner as to seek only a minimal constraint to cause the slit straps to wind together. This in the above example, when fluttering or looseness of any of the daughter coils is detected, the upper cutter 123 is not abruptly raised but instead the handle 127 is shifted enough to initiate a minimal degree of tacking which is usually too weak to both survive the knockdown bars and hold the strips together until they wind on the mandrel 125. Shifting of the handle 127 is continued until the tacking is just strong enough to reestablish the constraint of forcing the slit strips to wind together. When this constraint is established, the upper cutter may be maintained in its position or, preferably, it may again be lowered to repeat the cycle. Such lowering may be gradual and may be continued only until the looseness or fluttering is again detected. This manually controlled system can obviously be replaced by an automatic system which in effect "hunts" back and forth between a condition of being just barely able to maintain the constraint and a condition of being just barely unable to maintain the constraint.

Instead of employing the illustrated chordal flat of a depth of 0.006 inches, I contemplate employing coacting chordal flats on the upper and lower cutters 123, each 0.003 inches deep for a similar but more symmetric tacking action. In such case the upper and lower cutters 123 would be geared together for rotation to maintain the proper register of the flats. The cutters 123 are not geared together in the illustrated embodiment.

For better control of tacking strength I propose to use cutter relief shapes other than the chordal flat 63 as provided in the cutter 61 shown in FIG. 7. Such control may be necessary in order to accommodate variations in the thickness of the sheet metal transversely of the web as illustrated in FIG. 2. Alternatively such control may be desirable as when the lateral dimension of the web is extensive, as for example up to as much as fifty-two inches, which gives rise to the possibility of deflection of the arbor that mounts a plurality of slitting cutters. In each of these instances there is a possibility of significant variations in the vertical spacing between the cutting edge of the blade and the material being slit. Thus, it is desirable in a practical application of the decribed organization that the tack-producing relief in the slitting cutters be capable of producing interconnecting tacks of nearly uniform strength regardless of the variations in web thickness or of the presence of slight bowing of the arbor. It is further desirable that the relief provided on the slitting cutters be effective to relieve the normal cutting action produced by circular slitting edge of the cutter 61 indicated as 62 in FIG. 7 in a gradual manner so as to minimize the possibility of deforming the surface of the web material adjacent the tacks in order to reduce the danger of marking the material surface which marking is obviously detrimental to the finished product.

The chordal flat 63 provided in the edge of the cutter 61 is effective to produce tacks in the web material with only a minimal danger of marking or distorting the surface of the web material adjacent the affected region of the shear line. This characteristic of the chordal relief is due to the fact that it presents only a slight variation in the shape of the cutting edge between the circular portion thereof and the relief portion defined by the flat. As shown in FIG. 7 the extent of change in the dimension of the cutter measured radially from its center to the peripheral edge between the circular portion thereof indicated by the phantom line 62 and the flat is slight. Thus, it will be appreciated that the change in degree of engagement of the cutting edge with the metal in the region of the flat as the web passes through the rotating cutters will be minimal as compared with that in the region of the circular edge. As this variation in the edge of the cutter between its circular periphery and the edge defined by other relief profiles is rendered more abrupt as with the use of conventional notch shapes the danger of surface distortion of the web is concomitantly increased.

Other forms of cutter relief may be employed which provide even better product surface quality. Thus, as shown in FIGS. 7a and 7b, the tack-forming relief provided on the cutter 61' is defined by a notch ground into the slitting edge of the cutter in the form of gullwings. The gullwing notch is substantially symmetrical about its midpoint, having its flanks 63' provided each with a contour that is a convex arc. The notches illustrated in FIGS. 7a and 7b possess flanks 63' that are generally cycloidal in shape, the notch of FIG. 7a being formed as common cycloid while that of FIG. 7b is formed as a prolate cycloid.

It should be appreciated that these notches are symmetrical about their midpoint and possess flanks having a slope that increases gradually from the point of tangency of the relief with respect to the circular edge 62' of the rotary cutter. The convexity of the arcuate flanks maintains the cutting angle or rake of the slitter edge and causes it to increase toward the notch midpoint whereby the shearing of the web material in the vicinity of the tack is clean and without material deformation that would mark or distort the product.

Figure 24:
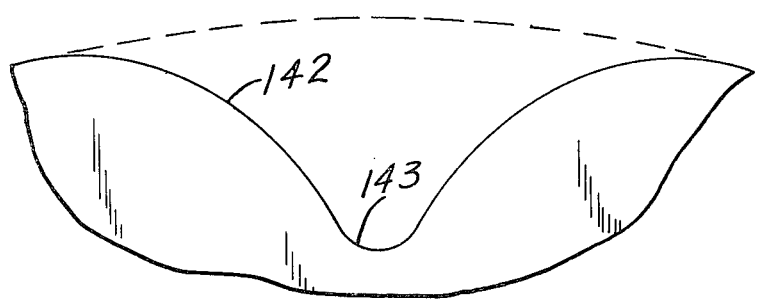
FIGS. 24 through 27 show alternative forms of cutter notch profiles similar to those shown in FIGS. 7, 7a and 7b that may be utilized in the practice of the invention.
Figure 25:
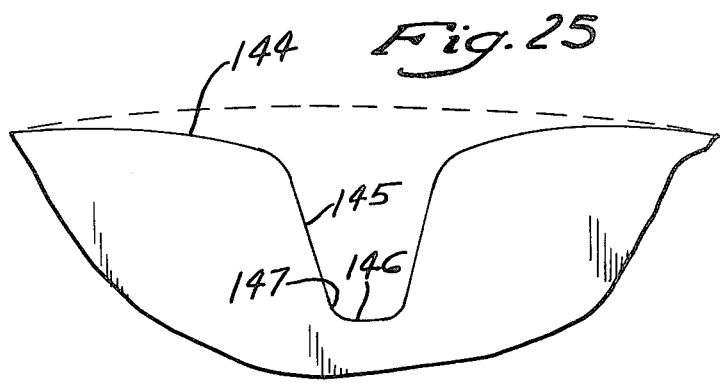
Figure 26:
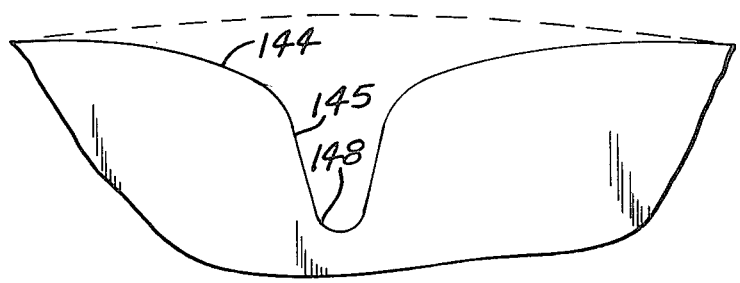

Accordingly, other cutter relief profiles having shapes comparable to the gullwing shape hereindescribed have utility in the practice of the invention. Such profiles are illustrated in FIGS. 24 through 26. The notch profile illustrated in FIG. 24 is similar to the prolate cycloid profile of FIG. 7b except that the flanks 142 are formed as circular arcs and the root 143 if formed as a circular arc tangent to the arcs of the flanks. That illustrated in FIG. 25 possesses flanks having a compound shape, the radially outer portion 144 being substantially cycloidal and the radially inner portion 145 being an inclined edge that extends tangentially from the outer portion. The root 146 may be a generally flat edge that merges at each end with the inclined edges 145 by means of circular fillets 147 or, as shown in FIG. 26, the root may be circular in shape, as indicated at 148, with its opposite ends tangent to the respective inclined edges 145.

Figure 27:
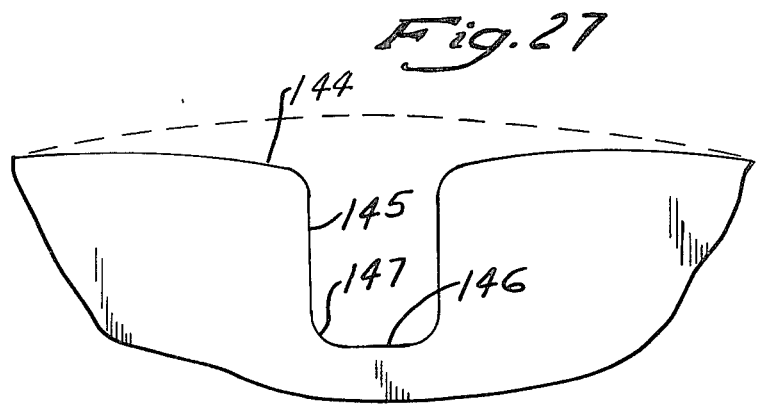

The notch of FIG. 27 is similar to that shown in FIG. 25 but wherein the radially inner portions 145' of the flanks are substantially parallel.

Also similarly configured reliefs can be provided on each pair of cooperating cutters geared to rotate together, each relief having an arc-intersect that is, for example, 0.003 inches deep.

With these respective relief shapes, the cross-sectional area of the connecting bridges formed by the relief varies with cutter spacing in a more definite manner, making for more precise control. With both cutters being relieved with such a shape, as the cutters are brought together, the mirror-image "gullwings" of the two reliefs increasingly overlap to provide a diamond shape of diminishing size which will finally disappear although presumably the degree of tacking necessary for winding constraint ceases before such point of disappearance is reached.

If one of the upper or lower cutters is advanced angularly relative to the other while they turn together with the reliefs in register, such advance has the effect of "tilting" the diamond shape. This tilt can be either "forward" or "backward" depending on the relative direction of the angular advance. Such relative angular advance can be accomplished by a conventional control means which allows a differential angular movement to be introduced between two counter-rotating cutters turning together.

The two cutters can be both moved toward and away from each other and advanced angularly relatively to each other for different tacking effects.

As increasing familiarity with a given sheet material is gained, a pre-set degree of tacking may be selected. A feature of the invention is that the degree of cohesion between daughter coils can actually be modified, from parent coil to parent coil, by adjusting the strength and frequency of the tacks, as for example changing the depth of relief in the slitting cutters, by adjusting the relative spacing of the cutters to make the cross-sectional extent of the individual tacks greater or less, and/or adjusting the frequency of tacking or degree of intermittent operation.

Instead of functioning as knockdown rolls, rolls such as 124 of FIGS. 13 and 18, and 35 of FIG. 3, may be set by appropriate shims or the like (not shown) to a spacing about the thickness of the sheet material being slit, or preferably slightly under such thickness, and the slitting cutters may be set to slit continuously. I have found that, under at least certain conditions, when the slits pass under the rolls 124 or 35 following their formation by the slitting cutters, they are rejoined to accomplish nonperiodic tacking. In one particular experimental setup of the apparatus illustrated in FIGS. 13, 18 and 19 dead soft copper of 0.005 inches thickness is slit and passed between the rolls 124 which are shimmed apart by shim plates (not shown) of 0.004 inches thickness to give a nominal reduction of 0.001 inch or 20%. However any actual reduction is difficult to observe in terms of sheet width growth and is not believed to be significant. The slits are tacked or rejoined by the rolling operation, and the connection appears to be stronger in the direction of travel than in a direction perpendicular to the sheet. The rejoining is not presently clearly understood and may be a pressure welding phenomenon or the like, and/or result from mechanical interengagement of burrs or the like formed by the slitting operation. In FIG. 17a I have schematically illustrated burrs as small curved lines at the tops and bottoms of the slits seen in the figure, which is a schematic cross section of a sheet which has been non-periodically tacked as just described, although if burrs form part or all of the interconnection they may occur at other locations within the interfaces formed by the slits as well as or rather than, as shown, toward the outer extremities of the interfaces. Such operation as described is non-intermittent or continuous since the shims cannot be changed during slitting.

Figure 21:
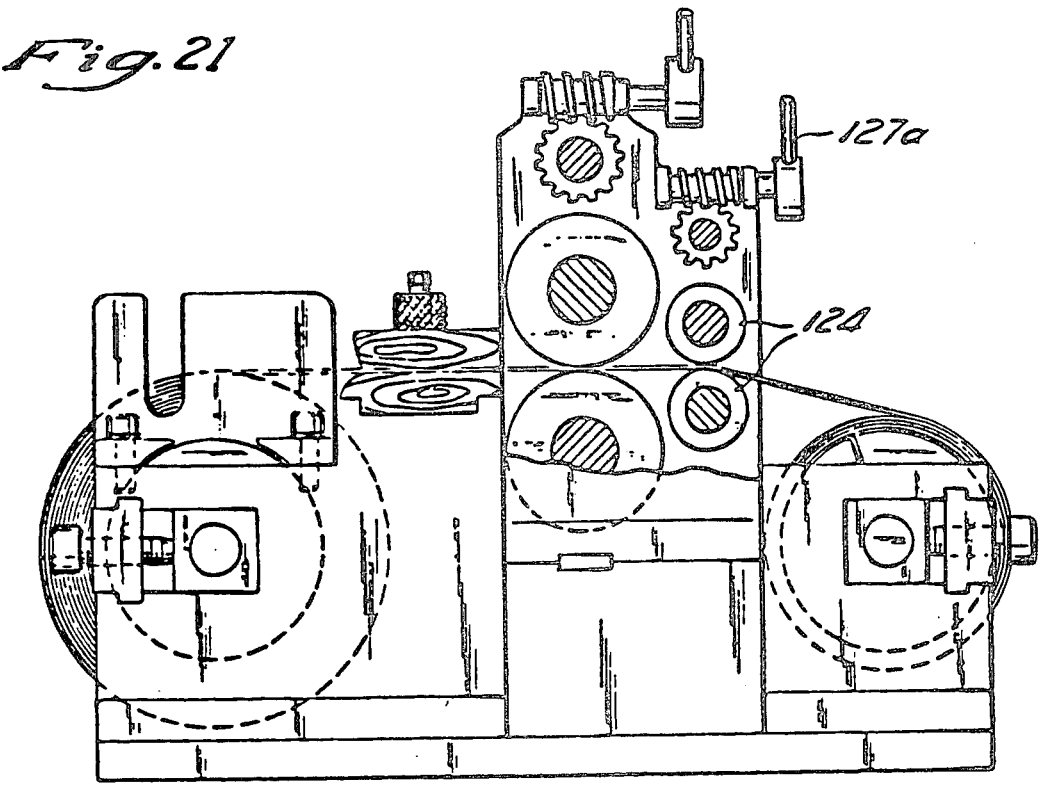
FIG. 21 is a side elevation, partly broken away, of a modification of the working model seen in FIGS. 13, 18 and 19.
Figure 22:
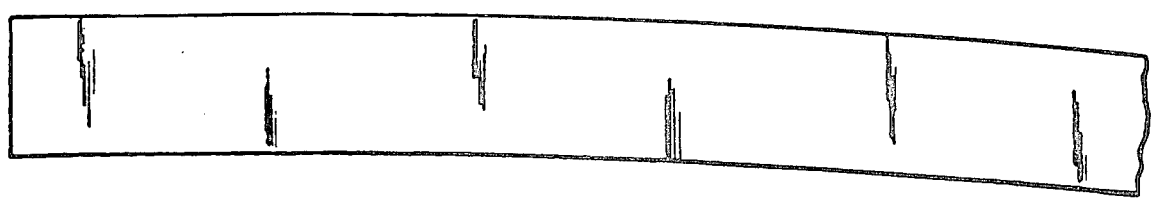
FIG. 22 is a schematic fragmentary foreshortened view of a slit strip or unwound daughter coil containing camber.
Figure 23:
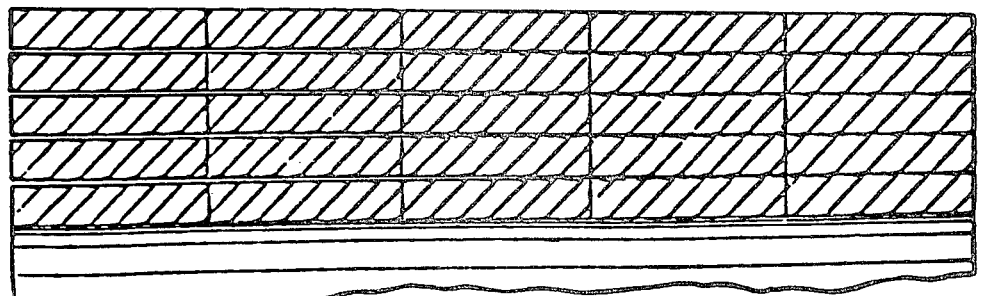
FIG. 23 is a schematic fragmentary cross-sectional view, ignoring sheet crowning, of part of a coil array containing the strip of FIG. 22.

In FIG. 21 I illustrate a modification of the apparatus shown in FIGS. 13, 18 and 19 which includes a control handle 127a which operates through a gear train, similarly to the handle 127, to change the rotative position of an eccentric mounting (not shown) for the upper roll 124, thereby adjusting the spacing between the rolls 124. Such handle can be shifted from a tacking position at which the rolls 124 are fairly close together to a non-tacking position at which the rolls are spaced apart to thereby give an intermittent type operation. To some degree, adjustment of tacking strength may be possible by adjustment of spacing of the rolls 124 through a range, from relatively strong at relatively close spacing to progressively weaker at progressively less close spacing.

Figure 20:
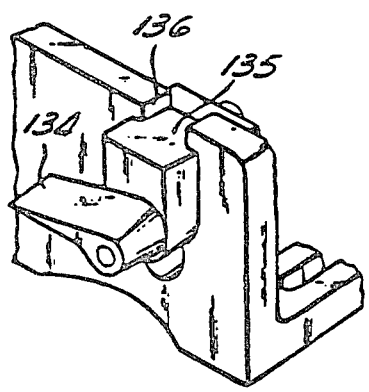
FIG. 20 is a view of a sciving tool used in the model.

The interconnections between the daughter coils such as the coils 140 are separable either by unwinding or by simultaneous breaking away of all connections. In the experimental apparatus of FIGS. 13, 18 and 19, unwinding separation can be accomplished by removing mandrel 125 with roll 141 on it from the windup station, turning it end for end, and substituting it for the original unwind mandrel (for the original unslit roll 121) at the unwind station. A single edgemost daughter coil 140, or 140a if the original roll 121 was not pre-trimmed, is trained over a wedge finger 134 pivoted on a slide 135 (FIG. 20) carried in a frame 136 (FIGS. 13, 18, 19) and through any suitable guide such as the knockdown rolls (the cutters may be moved apart if in the way. The leading ends of the remaining daughter coils 140 are taped down to the parent coil 141 to prevent them from flapping and snagging. The wedge finger 134 may be thinnest at its inboard side and increase in thickness toward its outboard side, as indicated by the flare of the stem portion of the finger seen in FIG. 20, to provide good lifting or prizing action. Unwinding may be done manually by pulling on the unwinding strip. As the daughter coil unwinds, the slide 135 allows the finger 134 to follow the diminishing periphery. A slight drag is applied to the parent coil 140 to prevent it from overrunning. The unwinding strip breaks readily and clearly from the parent coil. Subsequent daughter coils can be similarly unwound by shifting the frame bracket in which the slot 136 is formed laterally by the width of a daughter coil in order to establish the proper lateral position for the finger 134. The bracket is held in adjusted position on the fixed frame by the illustrated hold-down bolts.

I have found that in many cases a prizing device such as wedge finger 134 is unnecessary and the daughter coils will unwind readily in response to an unwinding pull, even that imposed only by the unsupported weight of a just-unwound reach or fall of daughter coil material.

It may be noted that when a daughter coil is unwound from the parent coil, rather than being broken away, the unwinding may be arranged to give a spreading action whereby the path of movement of the separating strip has a vector component parallel to the roll axis. Movement along such vector cannot be accommodated by flexing of the strip material around the axis of the roll but rather is stiffly resisted by reaction forces acting parallel to the axis and to the surface of the strip material. Unwinding arrangements involving a separating movement with such a vector component therefore can be very effective in subjecting the tacks to concentrated tensile stresses for good breaking action. In some instances this can be accomplished by gravity alone, as when a starting end of an endmost daughter coil is dropped from the lower end of a parent coil which is tilted toward a vertical position so that the starting end continues to unwind by its own weight. I have unwound hand-held experimental coils in this manner, allowing the endmost daughter coil to rapidly unwind in a falling helix and accumulate as loose strip on the floor, with the remainder of the parent coil remaining intact and the exposed side of the next-to-endmost daughter coil remaining a smooth and well-defined surface.

It may also be noted that the compactness of the slitting line contemplated by the present invention increases the practicality of shielding the fast-moving slit edges for the protection of the operator (although no such shielding is shown in the drawings). This is therefore one respect in which the invention offers substantial safety advantages.

From the above it will be apparent that the present invention provides a fresh approach to the solution of problems associated with conventional slitting operations.

While the methods and forms of apparatus and constructs herein described constitute preferred embodiments of the invention, it is to be understood that the invention is not limited to these precise methods and forms of apparatus and constructs, and that changes may be made therein without departing from the scope of the invention.

I claim:

1. In slitting apparatus having cooperating pairs of rotary slitting cutters defined by generally circular cutter bodies adapted to be rotatively driven, the outer periphery of each of said bodies defining mutually cooperating slitting edges engaging the opposite faces of an elongated web of sheet metal to impose a shearing action on the web material which progresses therethrough to an extent sufficient to effect severance of the residual portion of said material by fracture thereof, the improvement comprising at least one of said rotary cutters in each of said pairs containing a relief in its cutting edge, the radial depth of said pairs containing a relief in its cutting edge, the radial depth of said relief being less than the thickness of the sheet metal web to be cut, and the edges defining the relief about its complete periphery being operative to shear the metal web thereby cooperating with the circular periphery of th cutter to form an uninterrupted slitting edge capable of penetrating the web continuously throughout the full rotation of the cutter but effective in the region of the web operated on by the relief to terminate the shearing action short of the extent required to fracture said residual web portion whereby the adjacent facing edges of the slit web material are interconnected by said residual web portion.

2. Apparatus as recited in claim 1 in which said relief is defined by a chordal flat faired into the periphery of said cutting edge.

3. Apparatus as recited in claim 1 in which said relief is defined by a gullwing notch formed in the periphery of said cutting edge.

4. Apparatus as recited in claim 3 in said gullwing notch comprise converging convex, arcuate flanks.

5. Apparatus as recited in claim 4 in which said arcuate, convex flanks are generally cycloidal.

6. Apparatus as recited in claim 5 in which said gullwing notch is defined by flanks substantially forming a prolate cycloid.

7. Apparatus as recited in claim 4 in which said converging flanks terminate in a root formed as an arc tangent to each of the respective flanks.

8. Apparatus as recited in claim 3 in which said gullwing notch is defined by converging flanks terminating in a root, said flanks containing a radially outer portion formed by convex, arcuate curves and a radially inner portion formed by substantially straight edges that are at one end tangent to the curved outer portion and at the other end tangent to said root.

9. Apparatus as recited in claim 8 in which the straight edges of said radially inner portion are convergently inclined.

10. Apparatus as recited in claim 9 in which said root is formed as an arc tangent to each of the respective straight edges.

11. Apparatus as recited in claim 8 in which said root is a generally flat edge joined to the respective straight edges by tangent curved edges.

12. A rotary slitting cutter effective in association with a cooperating cutter to slit an elongated web of sheet metal along a continuous line of shear wherein said web is completely severed along part of said line of shear and only partly severed at intermittently spaced locations along said line of shear comprising:
 a generally circular cutter body adapted to be rotatively driven, the outer periphery of said body defining a slitting edge cooperable with the peripheral edge of the cooperating cutter;
 means forming a relief in said outer periphery of said body, said relief being of a radial depth less than the thickness of the sheet metal web to be cut, the edges defining the relief being cutting edges extending about the full periphery thereof to provide an uninterrupted cutting edge around the full circumference of said body capable of penetrating the web continuously throughout the full rotation of said body.

13. A rotary slitting cutter as recited in claim 12 in which said relief is a chordal flat.

14. A rotary slitting cutter as recited in claim 12 in which said relief is a gullwing notch.

15. A rotary slitting cutter as recited in claim 14 in which the flanks of said gullwing notch comprise converging convex arcs.

16. A rotary slitting cutter as recited in claim 15 in which said arcuate, convex flanks are generally cycloidal.

17. A rotary slitting cutter as recited in claim 16 in which aid gullwing notch is defined by flanks substantially forming a prolate cycloid.

18. A rotary slitting cutter as recited in claim 15 in which said converging flanks terminate in a root formed as an arc tangent to each of the respective flanks.

19. A rotary slitting cutter as recited in claim 14 in which said gullwing notch is defined by converging flanks terminating in a root, said flanks containing a radially outer portion formed by convex, arcuate curves and a radially inner portion formed by substantially straight edges that are at one end tangent to the curved outer portion and at the other end tangent to said root.

20. A rotary slitting cutter as recited in claim 19 in which said straight edges of said radially inner portion are convergently inclined.

21. A rotary slitting cutter as recited in claim 20 in which said root is formed as an arc tangent to each of the respective straight edges.

22. A rotary slitting cutter as recited in claim 19 in which said root is a generally flat edge joined to the respective straight edges by tangent curved edges.

* * * * *

UNITED STATES PATENT AND TRADEMARK OFFICE
CERTIFICATE OF CORRECTION

PATENT NO. : 4,266,458
DATED : May 12, 1981
INVENTOR(S) : John W. Rogers

It is certified that error appears in the above-identified patent and that said Letters Patent are hereby corrected as shown below:

Column 1, line 51, after "operations.", insert a new paragraph.

Column 15, line 10, after "143", change "if" to -- is --.

Column 18, line 4, claim 1, after "cutting edge,", delete

-- the radial depth of said pairs containing a relief in its cutting edge, --;

line 9, change "th" to -- the --.

Signed and Sealed this

Twenty-fifth Day of August 1981

[SEAL]

Attest:

Attesting Officer

GERALD J. MOSSINGHOFF

Commissioner of Patents and Trademarks